United States Patent [19]

Ottaviano

[11] Patent Number: 4,717,613

[45] Date of Patent: Jan. 5, 1988

[54] MECHANISM AND METHOD FOR PRODUCING CUSHIONING DUNNAGE

[75] Inventor: Gary W. Ottaviano, Bedford Heights, Ohio

[73] Assignee: Ranpak Corporation, Willoughby, Ohio

[21] Appl. No.: 609,001

[22] Filed: May 10, 1984

[51] Int. Cl.[4] .......... B31F 1/10; B32B 3/04

[52] U.S. Cl. .......... 428/129; 156/493; 156/510; 428/194; 493/357; 493/407; 493/967

[58] Field of Search .......... 428/126, 127, 129, 194, 428/535, 537; 156/493, 510; 493/357, 359, 394, 407, 464, 381, 967

[56] References Cited

U.S. PATENT DOCUMENTS 4,026,198 5/1977 Ottaviano .......... 493/357

4,109,040 8/1978 Ottaviano .......... 493/967

*Primary Examiner*—W. D. Bray

*Attorney, Agent, or Firm*—Baldwin, Egan, Hudak & Fetzer

[57] ABSTRACT

A cushioning dunnage producing mechanism and method wherein the mechanism utilizes one or more webs of sheet-like stock material, with the stock material being adapted to be disposed by the mechanism in generally superimposed relation and then fed into a crumpler section of tubular-like construction, to radially compress the sheet-like material into a pad-like dunnage product. The lateral edges of the stock material are caused to be rolled inwardly into generally spiral-like form, prior to passage of the stock material into the crumpler section, by a forming frame of generally triangular-like shape both in plan and in side elevation, with the nose of the forming frame being disposed closely adjacent the entranceway to the crumpler section. Meshed spur gears coacting with the crumpler section, coin or stitch the confronting portions of the rolled edges of stock material together, to hold the produced dunnage product in a pad-like configuration. The forming frame mechanism is operable to cause the central coined or stitched section of the pad-like product to be as thin as possible, while urging the stock material into the lateral pillow-like portions of the product, thereby providing greater resiliency to the pad-like product and one of lesser density.

32 Claims, 21 Drawing Figures

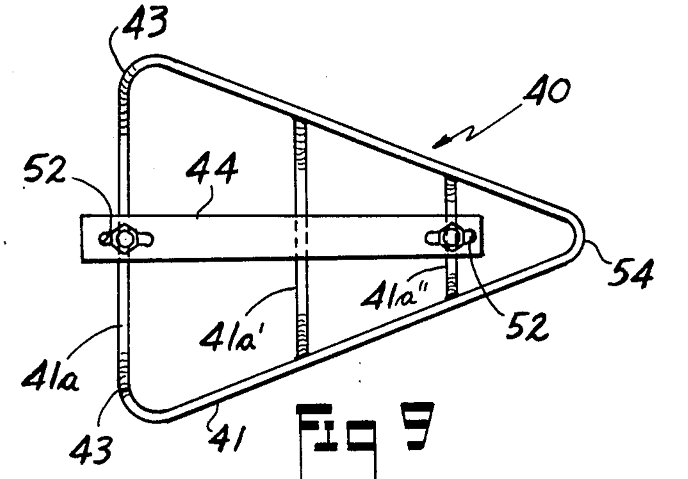
Fig 9
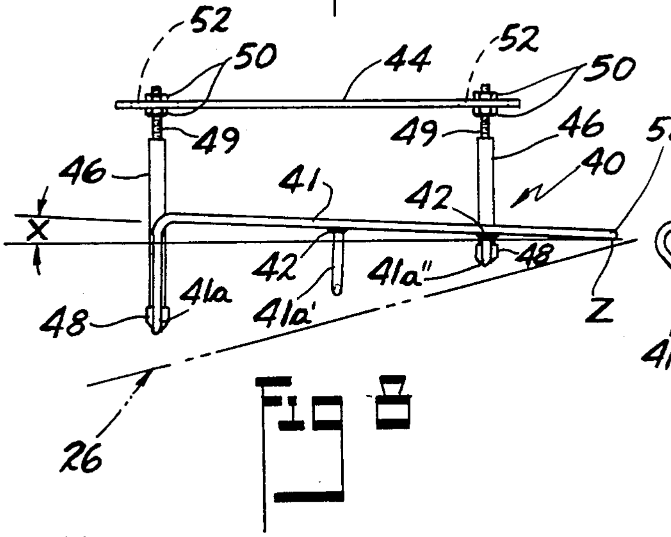
Fig 8
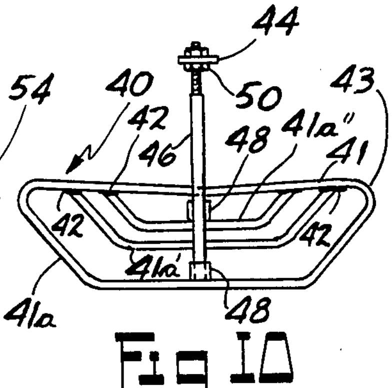
Fig 10
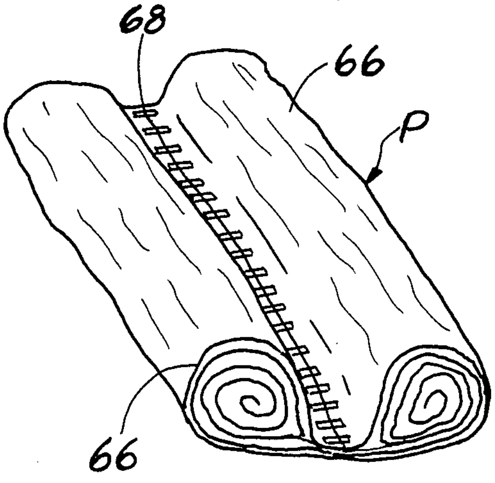
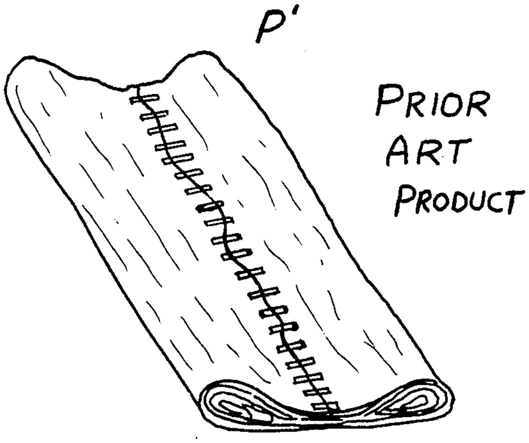
Fig 19
Fig 18

MECHANISM AND METHOD FOR PRODUCING CUSHIONING DUNNAGE

This invention relates in general to mechanism and method for producing packaging material or cushioning dunnage as it is known in the art, and more particularly to a dunnage producing mechanism operable to produce a continuous resilient pad-like dunnage product from sheet-like material, such as paper, and wherein the mechanism includes a novel stock material forming frame resulting in a materially improved pad-like cushioning dunnage product, and more particularly one having a greater portion of the utilized stock material disposed in the lateral pillow-like portions of the product, thus providing greater resiliency to the lesser density product.

BACKGROUND OF THE INVENTION

Dunnage producing mechanism for producing a resilient pad-like cushioning dunnage product having lateral pillow-like portions and a central connected portion are known in the art. U.S. Pat. No. 3,509,798 dated May 5, 1970 to G. R. Johnson discloses a mechanism for producing such general type of cushioning dunnage product, and a mechanism which utilizes a pusher or former to cause inward rolling of the lateral edges of the sheet stock material as it moves from the supply of stock into the crumpler section of the machine.

U.S. Pat. No. 3,655,500 dated April 11, 1972 to G. R. Johnson discloses a cushioning dunnage product producible on, for instance a mechanism of the general type of U.S. Pat. No. 3,509,798.

U.S. Pat. No. 3,603,216 dated Sept. 7, 1971 to G. R. Johnson relates to a method of producing resilient cushioning dunnage product of the general structural type discussed, but of greater density as compared to the dunnage product of the present invention.

U.S. Pat. No. 3,799,039 dated March 26, 1974 to G. R. Johnson discloses a cushioning dunnage producing mechanism including a trough coacting with the crumpler section of the machine and also coacting with a pusher or former means, for causing inward rolling of the lateral edges of the stock material prior to entry thereof into the crumpler section of the machine.

U.S. Pat. No. 4,026,198 dated May 31, 1977 to Gary W. Ottaviano discloses a cushioning dunnage producing mechanism of the general type of the present invention and which includes a triangular shape, in plan, pushing or forming frame coacting with a chute which coacts with the crumpler section of the machine, for forming the sheets into rolled configuration prior to their passing into and thence through the crumpler section. The forming frame in this arrangement of dunnage producing mechanism is of generally planar configuration in side elevation and as illustrated in the patent, is adapted to coact comparatively closely with the inclined bottom surface of the chute, and in substantial longitudinally spaced relation from the crumpler section of the mechanism.

SUMMARY OF THE INVENTION

The present invention provides a novel dunnage producing mechanism for producing from sheet-like stock material, such as for instance paper, a relatively light weight pad-like cushioning dunnage product, and wherein the mechanism is of the general type of applicant's aforementioned prior art patent except that the pusher or forming frame has been revised and rather than being generally planar in side elevation, is of greater three-dimensional configuration in side elevation, and wherein such forming frame is located close to and coacts with the crumpler section of the dunnage producing mechanism, to produce a dunnage product having lateral pillow-like sections of improved resiliency and mass and a central connecting section of a lesser amount of the stock material, so that the paper stock as utilized, is oriented into the lateral pillow-like sections for improved cushioning characteristics.

Accordingly, an object of the invention is to provide a novel mechanism for producing dunnage or packing material.

Another object of the invention is to provide a mechanism of the latter type which utilizes a plurality of webs or sheets of sheet-like material, such as paper, and forms such webs or sheets into a pad-like cushioning dunnage product possessing lateral pillow-like portions and a central compressed connecting section or portion, and wherein the mechanism includesa stock material forming frame of generally triangular configuration both in plan and in side elevation, with such frame being operable to cause the stock material to be directed into the lateral pillow-like sections of the dunnage product rather than orienting the same into the central compressed section of the pad-like product.

A further object of the invention is to provide a novel forming frame for use in a dunnage producing mechanism of the type utilizing a plurality of webs of superimposed stock material, such as paper, and causing the lateral edges of the webs to be rolled inwardly prior to the stock material being loosely generally radially crumpled in a crumpler section of the machine, whereby the lateral pillow-like sections of the pad-like cushioning dunnage product produced on the machine will have more resiliency and volume as compared to the pillow-like sections of the prior art cushioning dunnage product of generally similar configuration.

A still further object of the invention is to provide a novel dunnage product of relatively low density per unit volume in a pad-like configuration, comprising lateral pillow-like sections and a central compressed connecting section, and with the lateral pillow-like sections having greater resiliency and volume as compared to the pillow-like sections of the prior art pad-like cushioning dunnage product produced on somewhat similar type machines, and with the central compressed section of the pad-like cushioning dunnage product embodying a lesser mass or amount of the stock material, whereby the cushioning characteristics of the product are improved.

A still further object of the invention is to provide a novel method of producing cushioning dunnage in pad-like form.

Other objects and advantages of the invention will be apparent from the following description taken in conjunction with the accompanying drawings wherein:

BRIEF DESCRIPTION OF THE DRAWINGS

FIG. 1' is a modification of the roll mounting of FIG. 1;

FIG. 8 is an enlarged side elevational view of the forming frame and its supporting structure on the dunnage producing machine, illustrating the preferred tipped relationship of the forming frame with respect to the bottom surface (illustrated with a dot-dash line) of the associated chute of the dunnage producing mechanism;

FIG. 9 is a top plan view of the forming frame and support of FIG. 8;

FIG. 10 is a rear end elevational view of the forming frame and associated mounting structure of FIG. 8, taken generally along the plane of line 10—10 thereof;

FIG. 17' is a view generally similar to FIG. 17 but illustrating a further embodiment wherein the nose of the forming frame extends into the crumpler section in a generally similar manner as in the FIG. 11 embodiment; FIG. 18 is a perspective illustration of a section of pad-like dunnage product produced by prior art dunnage producing mechanism aforediscussed in the background of the invention section of this application; and FIG. 19 is a perspective illustration of pad-like dunnage product produced by the mechanism of the present invention and illustrating the greater volume of the lateral pillow-like sections thereof, and the lesser thickness central connecting section of the lesser density pad-like product.

DESCRIPTION OF PREFERRED EMBODIMENT AND ALTERNATE EMBODIMENT

Figure 1:
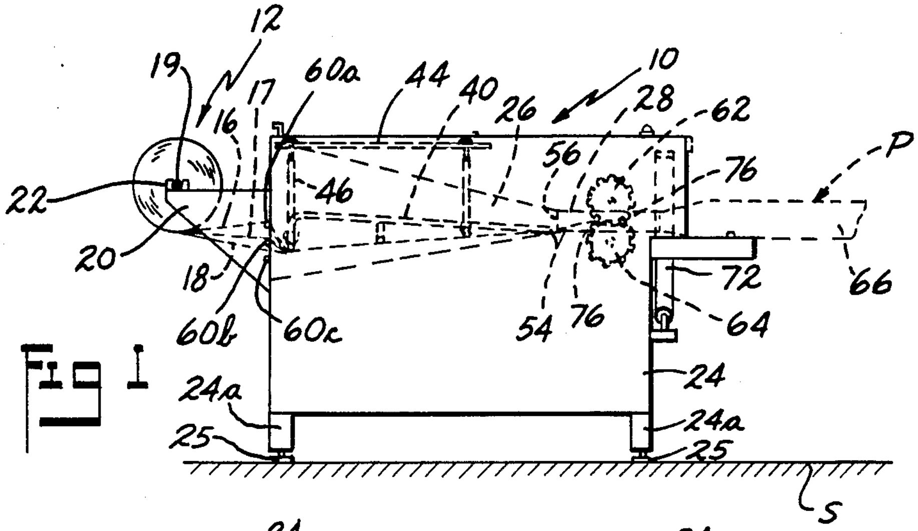
FIG. 1 is a side elevational, generally diagrammatic illustration of a cushioning dunnage mechanism embodying the invention.

Referring now again to the drawings, there is illustrated a dunnage producing machine 10 (FIGS. 1, 2 and 3) which utilizes a single multi-ply stock roll 12 of sheet-like material such as, for instance thirty-pound Kraft paper. In the embodiment illustrated, the stock roll 12 comprises a hollow core 14 of generally cylindrical configuration on which are rolled three superimposed webs or runs 16, 17 and 18 of paper stock material. The roll of stock material is adapted to be mounted on a supporting rod 19 extending through core 14, for rotation of roll 12 relative to the support structure 20, as the paper stock is drawn into the dunnage machine 10.

Open top, upstanding U-shaped guides 22 are provided in the embodiment illustrated, for generally loosely receiving the ends of the rod 19 and retain the rod on the support structure 20 while providing for rapid replacement of the stock roll when necessary. In the embodiment illustrated, the three superimposed webs 16, 17 and 18 of paper stock are of generally equal width. As an example, the elongated roll of stock material mounted on the machine may be of a dimension of approximately 9 inches in diameter by approximately 28 to 30 inches in width.

One end of the rod 19 extending through the stock roll, is adapted to have an opening therethrough receiving a pin projecting laterally from the rod, for preventing rotation of the rod upon rotation of the roll about rod 19. In other words, the roll of stock frictionally rotates relative to the rod 19 during pulling of the stock material into the dunnage producing mechanism in the embodiment illustrated.

Machine 10 comprises, in the embodiment illustrated, a support frame 24, including leg portions 24a which preferably include means 25 associated therewith for leveling the support frame with respect to the supporting surface S.

Frame 24 in this embodiment supports a longitudinally converging chute 26 (FIGS. 1, 2 and 6) which chute forms a guide for the webs of stock material 16, 17 and 18 as they are drawn off the stock roll 12 and are passed to a longitudinally elongated tunnel-like crumpler section 28 of the dunnage producing machine. In the embodiment illustrated, the chute 26 and the crumpler section 28 may be provided as an integral unit which can be conveniently formed of, for instance, fiberglass or plastic or some other such suitable material (FIGS. 6 and 7).

Figure 2:
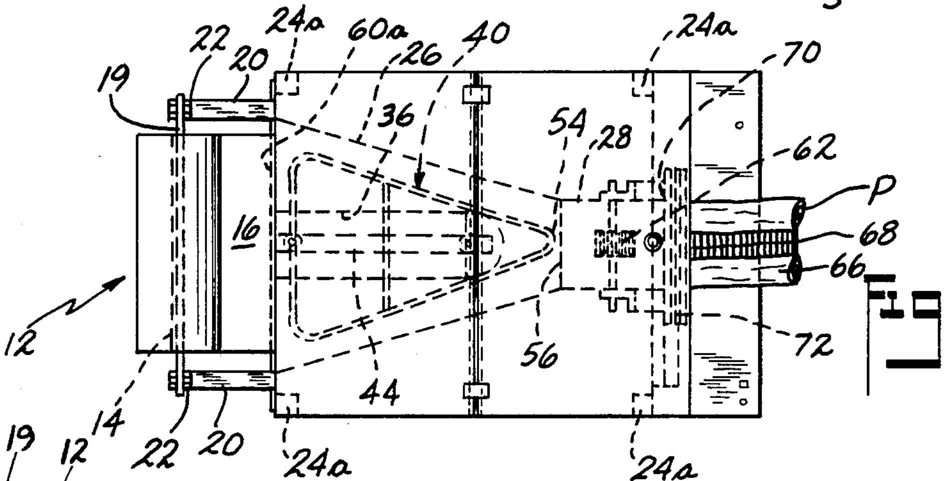
FIG. 2 is a top plan view of the mechanism of FIG. 1.
Figure 1:
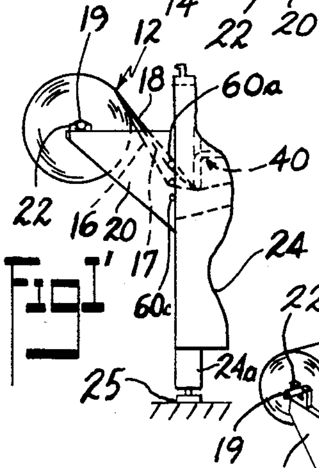
Figure 3:
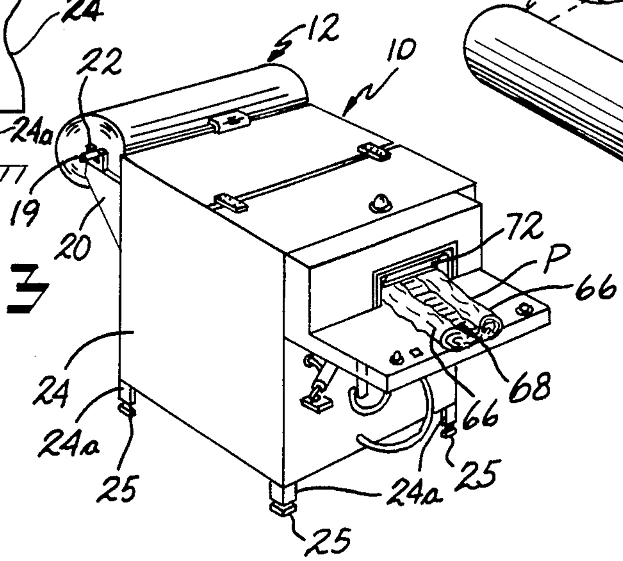
FIG. 3 is a generally perspective view of a dunnage producing machine of FIGS. 1 and 2, taken from the front end thereof, and illustrating the pad-like dunnage product being emitted by the machine.
Figure 4:
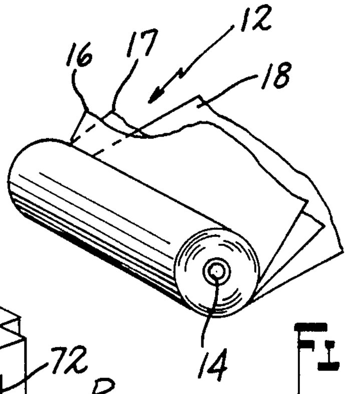
FIG. 4 is a fragmentary view of a roll of sheet-like stock material adapted for use in the dunnage producing mechanism of FIGS. 1-3.
Figure 5:
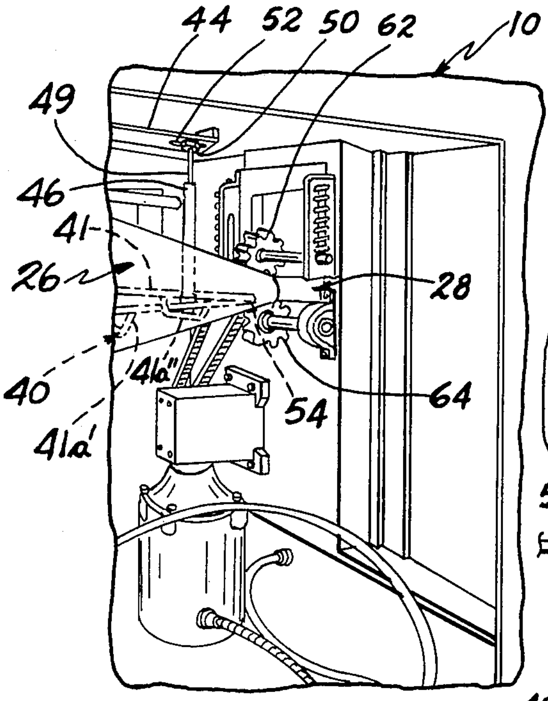
FIG. 5 is a fragmentary detailed view of the interior of the dunnage producing mechanism of FIGS. 1 through 3, and illustrating in particular the crumpler portion thereof and the forming frame (in dashed lines) coacting therewith, for producing the improved pad-like dunnage product.
Figure 6:
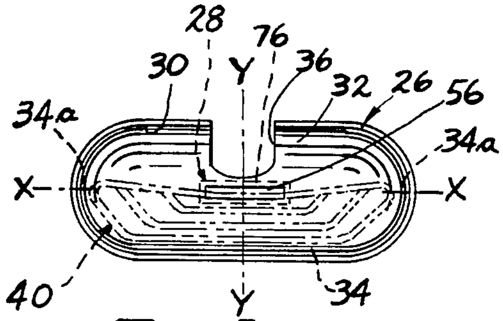
FIG. 6 is an end view taken generally along the plane of line 6—6 of FIG. 7, looking in the direction of the arrows, of the chute member and attached crumpler section of the dunnage producing mechanism of FIGS. 1-5, illustrating in phantom lines the paper forming frame which is adapted to be disposed therein.
Figure 7:
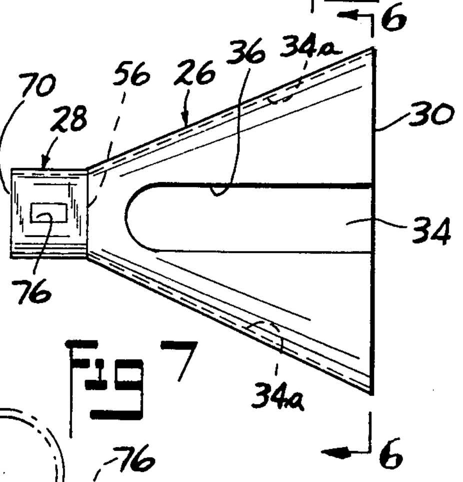
FIG. 7 is a top plan view of the chute and crumpler section of tne mechanism of FIGS. 1 through 6.

As can be best seen in FIGS. 1, 2 and 6, the chute section 26 comprises a widened mouth or entranceway 30, with the upper, lower and side wall interior surfaces 32, 34, 34a (FIG. 6) of the chute converging forwardly with respect to one another and with respect to the entranceway. Entranceway 30 is of generally oval configuration (FIG. 6), with the major axis X—X of the oval shape preferably disposed in a generally horizontal plane which passes through the horizontal center plane of the crumpler section 28. The minor axis Y—Y of the oval shaped entranceway is preferably disposed in a vertical plane passing through the longitudinal center axis of the crumpler section 28. The top wall of the chute may be recessed as at 36 (FIGS. 2, 6 and 7) for providing accessibility to the interior of chute 26 for mounting stock forming frame 40, with which the present invention is particularly concerned.

Forming frame 40 in the embodiment illustrated, is formed of preferably round metal bar stock material, and comprises an upper body portion 41 of generally V-shape, in plan, (FIG. 9), with depending generally U-shaped, in end elevation, ribs 41*a*, 41*a*′ and 41*a*″ extending transverse of the body portion 41 and connected as by means of welds. Accordingly, the overall frame presents a generally triangular external shape in plan (FIGS. 1 and 9). Since the transverse ribs 41*a*, 41*a*′, 41*a*″ decrease generally uniformly in depth from the rearwardmost rib 41*a* in a direction toward the forwardmost rib 41*a*″, the frame 40 also presents a generally triangular external shape in side elevation (FIG. 8). The frame 40 may be conveniently formed by bending the bar stock downwardly as at 43 (FIGS. 8, 9 and 10) at the rearward end of the body portion of the frame, to provide the aforementioned rearwardmost generally U-shaped (in end elevation) rib portion 41*a* which projects (as do the other welded ribs) generally perpendicular out of the plane of the upper body portion 41 of the frame.

As can be seen, the forming frame 40 is supported in depending relationship from generally horizontal strap 44 which is attached by any suitable means to the support frame 24 of the dunnage producing machine. Hangers 46 depending from strap 44 and extending through slot 36 in chute 26 are secured as by means of threaded ends to complementary threaded sockets 48 secured to the rearward and forward U-shaped ribs 41*a* and 41*a*″ respectively of the forming frame. The length of hangers 46 can be adjusted with respect to support strap 44 by means of threaded portions 49 and coacting nuts 50, so that the position of the frame 40 relative to the bottom surface 34 of the chute 26 and the crumpler section 28 can be selectively varied. Elongated slots 52 in strap 44 provide for adjustment of the frame 40 longitudinally thereof relative to the chute 26 and the crumpler section 28.

As can be best seen in FIGS. 1, 2 and 8, in this embodiment, the forming frame 40 is so proportioned and positioned with respect to the crumpler section 28, that the nose 54 of the frame 40 is disposed in close adjacent relationship to the entrance mouth 56 of the crumpler section 28 (FIGS. 1 and 2) and also, in this embodiment, in closely spaced relationship to the confronting surface 34 of the chute section 26, as best illustrated in FIG. 8. In this embodiment of machine, this spacing Z of the nose portion 54 from the confronting surface 34 of the chute 26 adjacent its juncture with crumpler section 28, is preferably between approximately one sixteenth to one-eighth of an inch.

The rear U-shaped rib 41*a* of the forming frame 40 as can be best seen in FIG. 8, is spaced a considerable greater distance from the surface 34, and in the embodiment illustrated, a distance of preferably approximately four to five inches from confronting surface 34 of the chute section 26. This may be accomplished by adjusting the associated supporting rods 46 by means of the threaded nuts 50, to provide the aforediscussed preferable clearances between the forming frame 40 and the confronting interior surface of the chute section. With such orientation, the frame 40 will be tilted at an angle X of approximately 3° to 6° with respect to the horizontal, which is the preferable range of tilt.

The frame 40 causes the sheet-like stock material as it passes from the stock roll 12 to the crumpler section 28, to be inwardly rolled along the lateral edges thereof, with the chute section 26 in this embodiment contributing a generally guiding function to the webs of stock material, and with the stock material sliding past the frame 40 in engaged relation therewith, and being urged laterally or downwardly as the web stock material passes from the stock roll 12 through the machine's separating means 60 and then past the forming frame into the crumpler section.

Separating means 60 in the embodiment illustrated, comprises a plurality of vertically spaced bar-like or rod-like elements 60*a*, 60*b* and 60*c* (FIGS. 1 and 2) through which is adapted to pass the webs of stock from the stock roll 12. As can be best seen from FIG. 1, the upper web 16 of stock material is adapted to pass over the separator rod 60*a*, while the middle web 17 passes over the separator rod 60*b*, and the lower web 18 passes over the lower separator rod 60*c*. Such separator mechanism causes the webs to be maintained in separated condition prior to their being urged back into generally juxtaposed condition at the forming frame 40, the latter being disposed downstream from the cylindrical separator rods and generally upstream from the crumpler section 28.

The lateral edges of the webs 16, 17 and 18 of the stock roll 12 after they pass the transversely extending separating rods 60*a*, 60*b* and 60*c*, commence to be turned inwardly by the engagement of the forming frame on the underlying generally abutting webs of stock material. Thus when the rolled lateral edges of the webs reach the narrowed entrance mouth 56 of the crumpler section 28, they have been rolled inwardly into generally abutting confronting relation with one another, and then the webbed stock material is crumpled radially inwardly by the crumpler section, and then is coined or joined along the central portion thereof, by the motor powered meshed gears 62, 64 comprising the connecting or stitching means for the mechanism. Reference may be had to aforementioned U.S. Pat. No. 4,026,198 which is incorporated herein by reference, and which describes in detail the connecting or stitching means of the mechanism.

The positioning of the frame nose 54 close to the entrance mouth 56 to the crumpler section and to the bottom surface of the chute section adjacent the juncture of the chute and crumpler sections, ensures that the material of the superimposed webs 16, 17 and 18 of stock material is urged outwardly into the pillow-like portions 66 (FIG. 19) of the formed pad-like product P and is not disposed in the compressed central section 68 of the pad-like product, thereby giving the pillow-like portions 66 greater dimension and resiliency, with the central connected section 68 of the pad-like product being composed of relatively minimum layers of connecting stock material, as coined by the meshed gears 62, 64 of the connecting means. This produces a pad-like product P of greater resiliency and greater cushioning capacity and less density as compared to the prior art pad-like product P′ (FIG. 18) produced on a dunnage producing machine of the type illustrated in aforementioned U.S. Pat. No. 4,026,198 or U.S. Pat. No. 3,509,798. The produced product P results in a dunnage pad having a density of approximately 0.6 to 0.7 pounds per cubic foot in the uncompressed condition of the produced pad-like product, utilizing thirty-pound Kraft paper as the stock material.

The forming frame 40 also urges the webs of stock material into engagement with one another along the longitudinal center sections thereof during the inward rolling of the lateral edges of the webs, and aids in maintaining alignment of the webbed stock material in its movement from the supply roll 12 toward the crumpler section 28.

After passing from the exit opening 70 of the crumpler section 28, the continuously formed pad-like product P (FIGS. 1 and 3) of stock material may be severed by a cutter mechanism 72 mounted on the rear end of the machine at the exit opening 70 therein. The cutter mechanism 72 may be of the type disclosed in aforementioned U.S. Pat. No. 4,026,198 and thus the cutter mechanism 72 will not be discussed in detail here.

Figure 11:
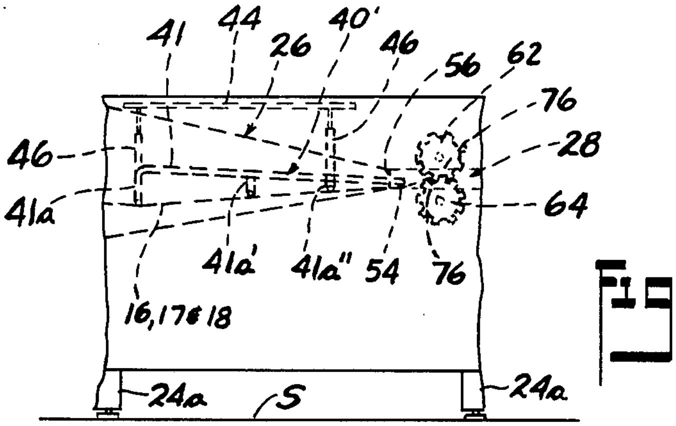
FIG. 11 is a fragmentary side elevational view of a dunnage producing machine embodying a modified forming frame as compared to that illustrated in FIGS. 1 to 3, and illustrating the frame nose extending into the crumpler section of the mechanism.

Referring now to FIG. 11, there is illustrated another embodiment of forming frame in conjunction with the crumpler section of the dunnage producing machine. In this embodiment, the forming frame 40' is of somewhat greater elongated dimension as compared to the frame 40 of the first described embodiment, so that the nose 54 of the frame 40' actually enters into and is disposed within the crumpler section 28 of the machine, and does not terminate outside the entrance mouth 56 to the crumpler section. Such nose, however, is in general alignment with the longitudinal vertical plane passing through the area of mesh between the coining gears 62, 64 in the crumpler section, and is in relatively closely spaced relationship to the interior bottom surface of the crumpler section 28, and preferably a dimension generally similar to that aforediscussed in conjunction with the first described embodiment. In any event, in this embodiment, as well as the first described embodiment, the nose portion 54 of forming frame 40 engages the flow of paper stock from the supply roll and causes inward rolling of the lateral edges of the stock material prior to passage of the stock material into the crumpler section. In the embodiment illustrated, the nose portion 54 of the forming frame is disposed generally below a horizontal plane passing through the mesh area of the powered coining gears 62, 64 extending through complementary openings 76 in the top and bottom walls of the crumpler section 28.

Figure 12:
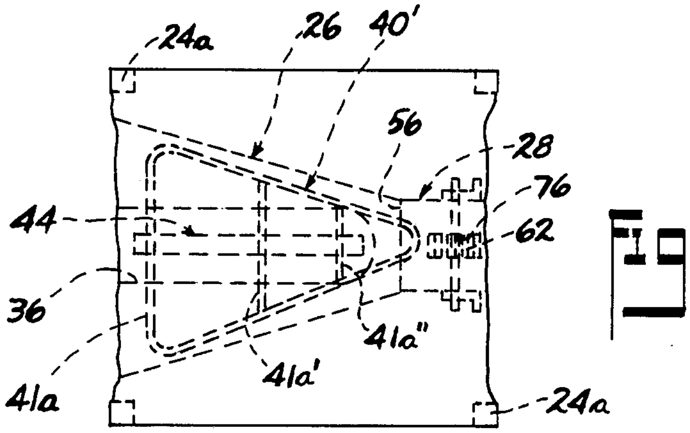
FIG. 12 is a fragmentary top plan view of the machine of FIG. 11.

In other respects, the dunnage producing machine of the FIGS. 11 and 12 embodiment may be generally similar to the machine of the first described embodiment.

Figure 13:
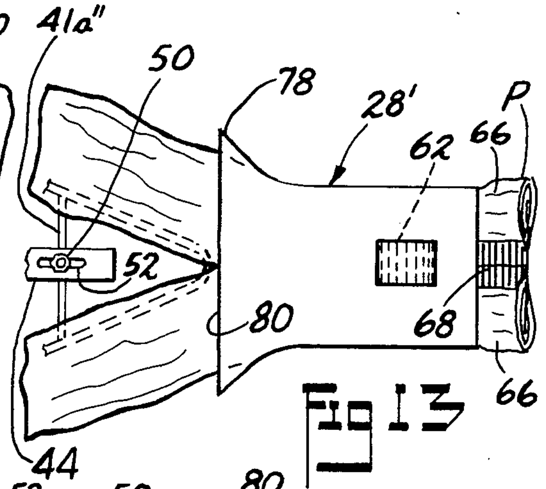
FIG. 13 is a fragmentary top plan view of a modified further embodiment of dunnage producing mechanism as compared to the above first and second embodiments and wherein the chute has been eliminated from the dunnage producing mechanism and the crumpler section has been modified to have a widely flared entrance mouth.

Referring now to FIG. 13, there is illustrated another embodiment of crumpler section 28' for a dunnage producing machine. In this embodiment, the chute section 26 of the prior disclosed embodiments is eliminated from the machine, and the crumpler section 28' embodies a funnel-like portion 78 at its stock material receiving end, defining a widened mouth 80 at the entranceway to the crumpler section 28' for receiving the rolled webs of sheet-like stock material to be compressed or crumpled inwardly. In this embodiment, the forming frame 40 which may be of the general type aforediscussed and illustrated in conjunction with the first described embodiment, is disposed closely adjacent to, but exteriorly of, the entranceway to the widened mouth of the crumpler section and with the frame 40 being positioned generally similar to that aforediscussed in conjunction with the FIGS. 1 through 5 embodiment, except that the nose 54 of the frame 40 deflects the flow of paper stock a somewhat greater degree as compared to the FIGS. 1 through 5 embodiment. It will be seen therefore that the forming frame 40 without the benefit of any chute, causes the inward rolling of the lateral edges of the superimposed webs of stock-like material as they are emitted by the stock roll 12 and move or are pulled by the coining gears 62, 64 into the crumpler section 28'. The tilt of the pusher frame with the nose thereof pushing downwardly against the superimposed webs as they commence to enter the widened mouth of the crumpler section causes the material of the webs to be directed laterally outwardly to be formed into the resilient pillow sections 66 of the produced pad-like product P and generally preventing the stock material from locating or being positioned along the central section 68 of the pad-like product where coining of the product occurs to connect together the lateral resilient pillow-like sections. Thus the mechanism of the FIGS. 13 and 14 embodiment is adapted to provide a pad-like product of relatively light density and improved resiliency in the lateral pillow-like sections thereof as compared to the prior art pad-like product.

Figure 14:
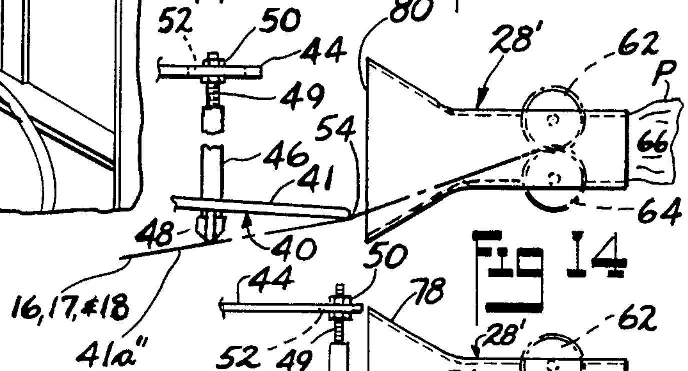
FIG. 14 is a broken fragmentary side elevational view of the embodiment illustrated in FIG. 13.

In other respects, the FIGS. 13 and 14 embodiment of dunnage producing machine may be generally similar to that of the FIGS. 1–5 embodiment.

Figure 15:
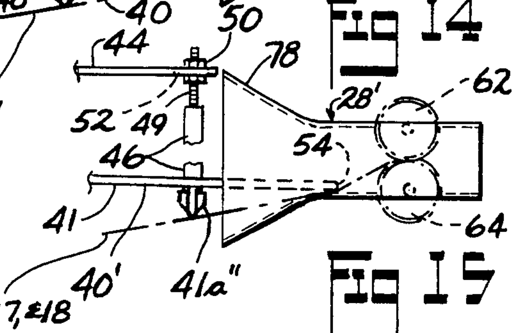
FIG. 15 is a fragmentary, broken illustration of a still further embodiment of wide flared crumpler section and coacting forming frame, with the nose of the frame extending into the crumpler section and in coacting relationship with the flared entrance mouth thereof.

FIG. 15 discloses a further embodiment of forming frame and crumpler section combination, and utilizes a crumpler section mechanism 28' generally similar to that aforedescribed in conjunction with the FIGS. 13 and 14 embodiment. However in this embodiment, the stock forming frame 40' may be of the general type aforediscussed in conjunction with the FIGS. 11 and 12 embodiment of dunnage producing mechanism wherein the nose 54 of forming frame actually enters or is disposed interiorly of the crumpler section, rather than being disposed exteriorly thereof. However in other respects, this embodiment of dunnage producing mechanism may be generally similar to that of the other embodiments except for the distinctions aforeenumerated. The clearance between the nose portion of the pusher frame 40' of the FIG. 15 embodiment and the confronting surface of the crumpler section 28' is preferably generally similar to that aforediscussed in connection with the FIGS. 11 and 12 embodiment of mechanism.

Figure 17:
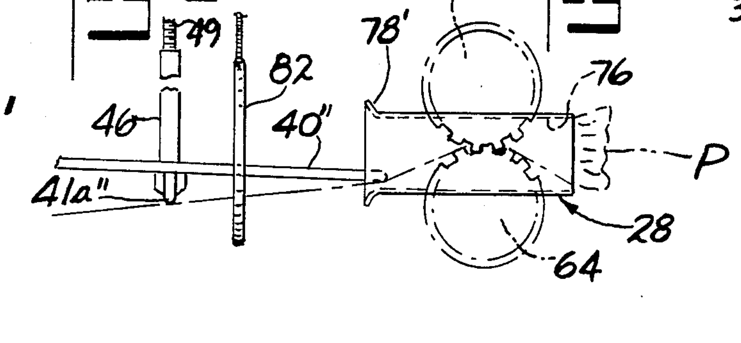
FIG. 17 is a fragmentary side elevational view of the FIG. 16 embodiment.
Figure 16:
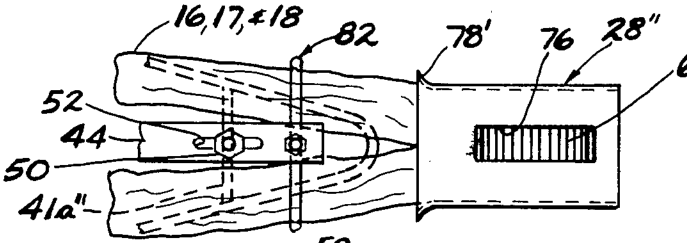
FIG. 16 is a fragmentary top plan view of a further embodiment of crumpler section having a much smaller flared entrance mouth, with the forming frame and an associated stock guide coacting with such crumpler section.
Figure 17:
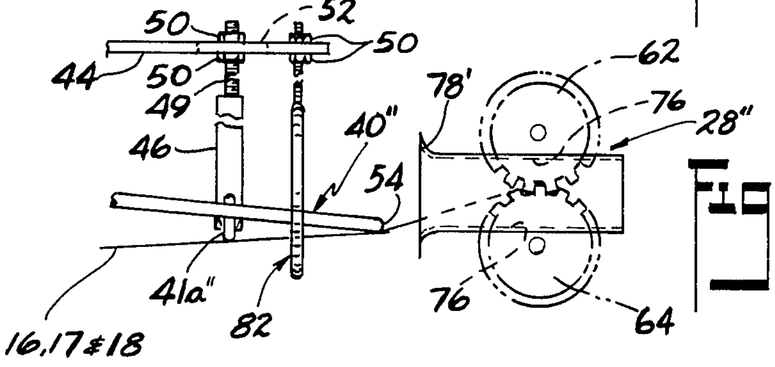

FIGS. 16 and 17 illustrate a still further embodiment wherein the crumpler section 28" has a lessor flair on the widened mouth portion 78' thereof, and the forming frame 40" coacting with the crumpler section 28" has a guide 82 through which the nose of the frame 40" passes and located generally adjacent the distal end of the frame for aiding in guiding the webs of rolled stock material into the crumpler section. Guide 82 which in the embodiment illustrated is in the form of a ring (in front elevation) may be rigidly suspended from support bar 44 by any suitable means, and prevents the rolled edge stock material from the possibility or likelihood of "tearing" as it enters the slightly flaired mouth of the crumpler section 28" , to be radially compressed and stitched or coined together by power driven gears 62, 64.

FIG. 17' illustrates a modified arrangement wherein the nose 54 of the forming frame extends into the mouth portion 78' of the crumpler section 28" closely adjacent the mouth portion. Guide 82, upstream from the crumpler section and encompassing the forming frame, aids in guiding the webs of stock material into the crumpler section without "tearing" of the stock material.

From the foregoing discussion and accompanying drawings, it will be seen that the invention provides a novel mechanism and method for producing comparatively low density pad-like cushioning dunnage product from web-like or sheet-like stock material, wherein the means for causing inward rolling of the lateral edges of the sheet-like material into generally rolled form prior to the passage of the sheet-like material into the crumpler mechanism of the machine comprises a stock forming frame mounted on the machine frame and being of generally triangular configuration in plan, with the nose of the stock forming frame disposed closely adjacent to the entrance to the crumpler mechanism (in some instances being disposed exteriorly of the crumpler, and in some instances actually entering into the entranceway of the crumpler) and wherein the web-like stock material is urged by the forming frame generally laterally as it is rolled inwardly, to be oriented or disposed into lateral pillow-like sections for the pad-like dunnage product with a minimum of stock material being disposed in the central coined section of the pad-like product, thus giving the pad-like product greater resiliency and reduced density.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a mechanism for producing low density pad-like cushioning dunnange from sheet-like stock material comprising, a support, crumpler means mounted on said support and having an entry opening, and an exit opening spaced lengthwise from said entry opening, said crumpler means being adapted to receive the sheet-like stock material, means for causing inward rolling of the lateral edges of the stock material into generally rolled form prior to passage of the sheet-like stock material into said crumpler means, means coacting with said crumpler means for connecting the confronting rolled edges, resulting in a unitary dunnange product of pad-like configuration as produced from said mechanism, said connecting means including means for pulling the stock material from a supply thereof into said crumpler means, said means for causing inward rolling including a forming frame mounted on said support and disposed generally in line with said crumpler means, said frame adapted to be engaged slidingly with and to press against the sheet-like stock material, said crumpler means being tunnel-like and being adapted to cause the stock material to be generally radially compressed as it passes into and through said crumpler means, said forming frame being generally triangular shaped in plan with the forward end nose portion of the triangular configuration disposed closely adjacent to said entry opening of said crumpler means, said nose portion of said frame projecting into the path of travel of the stock material from the supply thereof to said crumbler means, to cause deflection of the stock material adjacent said entry opening.

2. In a mechanism for producing low density pad-like cushioning dunnage from sheet-like stock material comprising, a support, crumpler means mounted on said support and having an entry opening, and an exit opening spaced lengthwise from said entry opening, said crumpler means being adapted to receive the sheet-like stock material, means for causing inward rolling of the lateral edges of the stock material into generally rolled from prior to passage of the sheet-like stock material into said crumpler means, means coacting with said crumpler means for connecting the confronting rolled edges, resulting in a unitary dunnage product of pad-like configuration as produced from said mechanism, said connecting means including means for pulling the stock material from a supply thereof into said crumpler means, said means for causing inward rolling including a forming frame mounted on said support and disposed generally in line with said crumpler means, said frame adapted to be engaged slidingly with and to press against the sheet-like stock material, said crumpler means being tunnel-like and being adapted to cause the stock material to be generally radially compressed as it passes into and through said crumbler means, said forming frame being generally triangular shaped in plan with the forward end nose portion of the triangular configuration disposed closely adjacent to said entry openeing of said crumpler means, and wherein said forming frame includes a plurality of generally U-shaped, in end elevation, ribs extending transverse of said frame and progressively diminishing in height from the rear end portion thereof in direction toward said forward end nose portion thereof, said forming frame presenting a generally triangular shaped configuration in side elevation.

3. A mechanism in accordance with claim 2 wherein said forming frame is oriented in generally tipped condition with respect to the horizontal in its operative position in said mechanism, and including means for adjusting the tipped orientation of said forming frame with respect to the horizontal.

4. A mechanism in accordance with claim 1 wherein said forming frame is formed of round metal bar stock.

5. A mechanism in accordance with claim 1 wherein the rear end portion of said frame is of a greater transverse dimension as compared to the transverse dimension of said entry opening of said crumpler means.

6. A mechanism in accordance with claim 1 including means on said support upstream from said forming frame, for separating multi-ply sheets of stock material as the latter move from the stock material supply toward said crumpler means, and wherein said means for causing said inward rolling includes a chute having an entrance mouth disposed in confronting relation to said separating means and extending lengthwise between said crumpler means and said separating means, for generally funneling said rolled edge stock material toward said crumpler means.

7. A mechanism in accordance with claim 6 wherein said chute extends continuously from said separating means to said crumpler means, the central axis of said entrance mouth of said chute being disposed substantially in a horizontal plane passing through the longitudinal axis of said crumpler means, with the distal end of said end nose portion being adapted to engage the stock material and cause inward rolling of the lateral edges thereof.

8. A mechanism in accordance with claim 6 wherein said entrance mouth of said chute is of generally oval configuration in elevation with the major axis thereof extending in a generally horizontal plane and the minor axis thereof extending in a generally vertical plane, the latter passing through said longitudinal axis of said crumpler means, the longitudinal axis of said forming frame being disposed in said vertical plane.

9. A mechanism in accordance with claim 6 wherein said separating means comprises a plurality of generally vertically spaced bars extending transverse of said support and about which a respective sheet of the stock material is adapted to move in its travel past said forming frame and toward said crumpler means.

10. A mechanism in accordance with claim 1 wherein said connecting means comprises generally vertically spaced coining means disposed generally centrally of said crumpler means in a direction transverse of the latter and adapted to stitch confronting rolled edges of the sheet-like stock material together.

11. A mechanism in accordance with claim 10 including means movably mounting at least one of said coining means with respect to the other of said coining means for providing for movement of the coining means relative to one another during the stitching operation.

12. A mechanism in accordance with claim 11 wherein said movable mounting means includes resilient means urging one of said coining means toward the other of said coining means, and means permitting movement of one of said coining means relative to the other of said coining means against the resistance of said resilient means.

13. A mechanism in accordance with claim 10 wherein said means for causing said inward rolling includes a chute having an entrance mouth into which the stock material from said supply is fed, said entrance mouth being of generally oval shape in end elevation with the major axis of said entrance mouth being disposed substantially in a horizontal plane, the last mentioned plane passing through said coining means.

14. A mechanism in accordance with claim 2 wherein the rearward end of said forming frame is disposed at a greater distance from a confronting stock material guide surface as compared to the distance of the forward nose end portion of said frame from said guide surface, whereby the stock material adapted to slide past said frame will be urged toward the outer lateral edges thereof during the rolling operation on said stock material so as to maintain the lateral rolled edge portions of the produced pad-like product possessing greater volume and resiliency while maintaining a minimum amount of stock material at the central connected portion of said pad-like product.

15. A mechanism in accordance with claim 1 wherein said nose end portion of said frame is disposed within a range of approximately one-sixteenth of an inch to one-eighth of an inch from an underlying stock material guide surface.

16. A mechanism in accordance with claim 1 wherein the nose end of said frame is disposed generally adjacent said entry opening to said crumpler means, upstream from said entry opening, and below a horizontal plane passing through said connecting means.

17. A mechanism in accordance with claim 1 wherein the nose end of said frame is disposed generally adjacent said entry opening to said crumpler means, slightly downstream from said entry opening and within said crumpler means, and below a horizontal plane passing through said connecting means.

18. A mechanism in accordance with claim 1 wherein said connecting means comprises vertically spaced rotatable meshed gears disposed generally centrally of said crumpler means in a direction transverse of the latter and adapted to coin together confronting rolled edges of the sheet-like stock material, said crumpler means comprising a tunnel-like member having a rectangular shaped entrance with the greater dimension of said rectangular shape being in a direction transverse of said mechanism, said tunnel-like member having a pair of spaced openings in the upper and lower walls thereof through which extend said gears, said end nose portion of said frame disposed adjacent said tunnel-like member and in general alignment with the vertical longitudinal plane of said tunnellike member.

19. A mechanism in accordance with claim 1 wherein the second mentioned means includes a chute upstream from said crumpler means and having an oval shaped entrance mouth, said chute and said crumpler means being integrally formed as a unit, said crumpler means being disposed in general alignment with a horizontal plane passing through the major axis of said chute entrance mouth, and the bottom wall of said chute merging with said crumpler means.

20. A mechanism in accordance with claim 3 wherein said frame is tilted at an angle of between approximately 3° to 6° with respect to the horizontal so as to locate the nose end portion of said frame projecting into the path of travel of the stock material from the supply thereof into said crumpler means.

21. A mechanism in accordance with claim 6 wherein said frame occupies in a longitudinal direction substantially the full longitudinal length of said chute with the nose portion of said frame terminating closely adjacent the entrance to said crumpler means.

22. A mechanism in accordance with claim 1 including a guide comprising the second mentioned means through which said nose portion of said frame extends, said guide being operative to aid in guiding the rolled edge stock material into said crumpler means, and aiding in preventing tearing of the stock material.

23. A forming frame for use in a mechanism adapted to produce low density pad-like cushioning dunnage product from sheet-like stock material, with such mechanism comprising a tunnel-like crumpler section having an entry opening and an exit opening spaced lengthwise from said entry opening, with said crumpler section being adapted to receive the sheet-like stock material therein and to generally radially compress it as it passes through said crumpler section, said forming frame being adapted to engage on its underside the sheet-like stock material as it travels from a source of stock material to the crumpler section and to cause inward rolling of the lateral edges of the stock material into generally rolled form prior to passage of the sheet-like stock material into the crumpler section, said forming frame including generally U-shaped in end elevation ribs extending transversely of said forming frame adjacent the lower portion thereof with said ribs being spaced longitudinally of said forming frame, said forming frame being of generally triangular configuration in plan, with the forward end nose portion of said forming frame being adapted to be disposed closely adjacent to the entry opening of the crumpler section with said nose portion projecting into the path of travel of the stock material as it travels from the source of stock material to the crumpler section.

24. A forming frame in accordance with claim 23 wherein said frame comprises a V-like in plan body portion and with said generally U-shaped in end elevation ribs extending transverse of said body portion in depending relation and progressively diminishing in height from the rear end of the body portion in a direction toward the forward nose end of the body portion, said frame in side elevation presenting a generally right triangular configuration, while being of delta triangular configuration in plan.

25. A forming frame in accordance with claim 23 wherein said body portion and said ribs in transverse section are defined by arcuate exterior surfaces.

26. In a method of producing cushioning dunnage in pad-like form from sheet-like stock material comprising taking at least one web of sheet-like stock material of predetermined width, and moving it longitudinally while rolling the lateral edges of web inwardly into generally spiral-like form, pushing laterally on the web by means of a triangular shaped, in plan, forming frame with the nose of the frame disposed close to the entranceway to a tunnel-like crumpler section, and projecting said nose of said frame into the path of travel of said web as it moves from the supply source thereof of said crumpler section to cause deflection of the web adjacent said entranceway, and pulling the web of stock material as tensioned laterally by said frame through the crumpler section to cause said longitudinal movement of said web and radial compression of the rolled edge stock material into pad-like form comprising lateral resilient pillow-like portions, and then connecting together the confronting rolled and compressed lateral edge portions of the pad product whereby the central connecting section of the pad product is maintained as thin as possible while stock material is urged into the lateral pillow-like portions.

27. A method in accordance with claim 26 including the step of providing a plurality of webs of sheet-like material, orienting the latter into superimposed relation and pushing the webs laterally into generally tensioned relation with one another by said frame prior to radially crumpling the sheet-like material into the pad-like configuration, and utilizing connecting means to accomplish said connecting by coining of said central section.

28. A method in accordance with claim 26 wherein said frame is tipped with respect to the horizontal between about 3° to 6° to orient said frame nose close to said entranceway to said crumpler section and into the path of travel of the stock material.

29. Paper dunnage product comprising a pad-like article for use in packaging, formed from paper sheet or the like with the lateral edges of the sheet having been generally loosely rolled inwardly and forming radially crumpled pillow-like portions defining the lateral extremities of said packaging article, and means connecting the rolled confronting edges of the pillow-like portions together along the generally central portion of the pad-like article, lengthwise thereof, the last mentioned means comprising lengthwise spaced transversely extending coined portions of said paper material, said laterally arranged pillow-like portions of said article possessing considerable resiliency, each being of a substantially greater thickness than said central coined connected portion, and occasioned by said paper material having been urged outwardly into said pillow-like portions of the formed product instead of remaining in said central connected portion giving said pillow-like portions greater dimension and resiliency, with said central connected portion being comprised of minimum layers of connected paper material as coined, said article having a density of approximately 0.6 to 0.7 pounds per cubic foot as compared to a density approxiamtely one pound per cubic foot for prior art dunnage product pad-like articles of generally similar configuration.

30. A dunnage product in accordance with claim 29, formed from thirty-pound kraft paper.

31. A dunnage product in accordance with claim 30 wherein said article consists of three individual webs of said thirty-pound Kraft paper originally disposed in superimposed relation with respect to one another and in single roll form, and with the corresponding lengthwise edges of the plurality of webs when the latter are drawn from said roll to form said product being disposed in interleaved, inwardly rolled, radially crumpled form, providing said pillow-like portions, and wherein said high resiliency and greater dimensional size of said pillow-like portions and said minimum layer centrally connected portion are provided by having the nose of a triangular shaped in plan forming frame of a dunnage converter machine in which said product is produced extending into the path of travel of said webs from the source of supply thereof to the coining means on the converter as the webs move from the supply source to the coining means, for causing lateral deflection of the webs at the engagement of the nose with the webs before passage of the webs into the coining means.

32. In a method of producing cushioning dunnage in pad-like form from a sheet-like stock material comprising taking at least one web of sheet-like stock material of predetermined width, and moving it longitudinally by means of a pair of coacting rotatable members while rolling the lateral edges of web inwardly into a generally spiral-like form, pushing laterally on the web by means of a triangular shaped, in plan, forming frame with the nose of the frame disposed upstream from said coacting members but generally close to the latter and projecting said nose of said frame into the path of travel of said web as it moves from the supply source thereof to said coacting members, to cause deflection of the web generally close to said coacting members and including pulling the web of stock material by the rotation of said coacting members, while the stock material is tensioned laterally by said nose of said frame, to cause said longitudinal movement of said web and formation of the rolled edge stock material into pad-like form comprising lateral resilient pillow-like portions, and then connecting together the confronting rolled edge portions of the pad-like form by stitching the central lengthwise extending section of the pad-like form utilizing said rotating coacting members whereby the central connecting section of the pad-like form connecting said pillow-like portions together is maintained as thin as possible while stock material is urged into the said lateral pillow-like portions.

* * * * *